US008189246B2

(12) United States Patent
Washino

(10) Patent No.: US 8,189,246 B2
(45) Date of Patent: May 29, 2012

(54) IMAGE FORMING SYSTEM AND METHOD FOR FORMING A COLOR IMAGE ON RECORDING MEDIUM AND FOR FORMING A TRANSPARENT IMAGE OVERLAPPING THE COLOR IMAGE ON A RECORDING MEDIUM

(75) Inventor: Shigeki Washino, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 760 days.

(21) Appl. No.: 12/183,522

(22) Filed: Jul. 31, 2008

(65) Prior Publication Data

US 2009/0092405 A1 Apr. 9, 2009

(30) Foreign Application Priority Data

Oct. 4, 2007 (JP) ................................ 2007-261137

(51) Int. Cl.
*H04N 1/46* (2006.01)

(52) U.S. Cl. ....... 358/540; 358/1.9; 358/3.26; 358/3.28; 399/27; 399/39; 399/341; 399/342

(58) Field of Classification Search ........................ None
See application file for complete search history.

(56) References Cited

U.S. PATENT DOCUMENTS 5,260,753 A * 11/1993 Haneda et al. .................. 399/54
6,437,817 B1 * 8/2002 Ohta et al. .................... 347/254
6,498,910 B2 * 12/2002 Haneda .......................... 399/51
6,507,668 B1 * 1/2003 Park ............................. 382/169
6,681,095 B1 * 1/2004 Tsuda ........................... 399/341
6,775,027 B1 * 8/2004 Yamamura ..................... 358/1.9
7,034,964 B2 * 4/2006 Suzuki ......................... 358/3.06
7,236,642 B2 * 6/2007 Ahrens et al. ................. 382/261
7,304,770 B2 * 12/2007 Wang et al. .................. 358/3.06
7,324,240 B2 * 1/2008 Ng ................................ 358/1.9
7,397,565 B2 * 7/2008 Nakaya et al. ................ 356/446
7,491,424 B2 * 2/2009 Hersch et al. ................. 427/267
7,495,679 B2 * 2/2009 Chou ............................ 345/690
7,502,140 B2 * 3/2009 Yamamura ..................... 358/1.9
7,687,217 B2 * 3/2010 Tamagawa et al. ...... 430/124.53
7,724,402 B2 * 5/2010 Ichikawa et al. .............. 358/474
2004/0081476 A1 4/2004 Hama
2005/0135851 A1 * 6/2005 Ng et al. ....................... 399/341
2005/0206598 A1 * 9/2005 Yamazaki et al. .............. 345/87
2005/0208235 A1 * 9/2005 Murai et al. ............... 428/32.38
2005/0214669 A1 * 9/2005 Hayashi et al. ............ 430/109.4

(Continued)

FOREIGN PATENT DOCUMENTS

CN 1482516 3/2004
CN 1493929 5/2004
CN 1732414 2/2006

(Continued)

*Primary Examiner* — King Poon
*Assistant Examiner* — Dung Tran
(74) *Attorney, Agent, or Firm* — Morgan, Lewis & Bockius LLP

(57) ABSTRACT

An image forming system includes: an obtaining unit that obtains image information including a grey-level value of a pixel; a modifying unit that modifies the grey-level value of the pixel included in the image information obtained by the obtaining unit; a color image forming unit that forms on a recording medium a color image in accordance with information showing the color image including the grey-level value of the pixel modified by the modifying unit; and a transparent image forming unit that forms on the recording medium a transparent image overlapping the color image.

12 Claims, 5 Drawing Sheets

U.S. PATENT DOCUMENTS

2005/0243341 A1* 11/2005 Ng .............................. 358/1.9
2006/0140650 A1* 6/2006 Yokote .......................... 399/27
2006/0287473 A1 12/2006 Fukui et al.
2007/0127940 A1* 6/2007 Zaima ........................... 399/53
2007/0171444 A1* 7/2007 Washino ....................... 358/1.9
2010/0021194 A1* 1/2010 Toyohara et al. .............. 399/69

FOREIGN PATENT DOCUMENTS

JP 62-127753 6/1987
JP 07-023974 1/1995
JP 2006-220740 8/2006
JP 2007-108717 4/2007

* cited by examiner

| L(μm) | 20 | 30 | 50 | 80 | 100 | 120 | 150 |
|---|---|---|---|---|---|---|---|
| AVERAGE SCORE | 2.1 | 2.5 | 3.3 | 3.0 | 2.7 | 2.6 | 2.3 |

| GLOSSINESS | 50 | 60 | 70 | 80 | 90 |
|---|---|---|---|---|---|
| AVERAGE SCORE | 1.7 | 2.2 | 2.7 | 3.2 | 3.5 |

| W(%) | 5 | 10 | 15 | 20 | 25 | 30 |
|---|---|---|---|---|---|---|
| AVERAGE SCORE | 1.6 | 2.6 | 3.1 | 2.6 | 2.2 | 2.0 |

IMAGE FORMING SYSTEM AND METHOD FOR FORMING A COLOR IMAGE ON RECORDING MEDIUM AND FOR FORMING A TRANSPARENT IMAGE OVERLAPPING THE COLOR IMAGE ON A RECORDING MEDIUM

CROSS-REFERENCE TO RELATED APPLICATIONS

This application claims priority under 35 USC 119 from a Japanese patent application No. 2007-261137 filed Oct. 4, 2007.

BACKGROUND

1. Technical Field

The present invention relates to an image forming system.

2. Related Art

To represent a color like a metal surface (hereinafter, referred to as "metallic color"), a technology to use a toner including a metal powder, is known.

SUMMARY

According to an aspect of the invention, an image forming system, includes: an obtaining unit that obtains image information including a grey-level value of a pixel; a modifying unit that modifies the grey-level value of the pixel included in the image information obtained by the obtaining unit; a color image forming unit that forms on a recording medium a color image in accordance with information showing the color image including the grey-level value of the pixel modified by the modifying unit; and a transparent image forming unit that forms on the recording medium a transparent image overlapping the color image.

BRIEF DESCRIPTION OF THE DRAWINGS

An exemplary embodiment of the invention will be described in detail based on the following figures, wherein.

DETAILED DESCRIPTION

1. First Embodiment 1-1. Configuration

Figure 1:
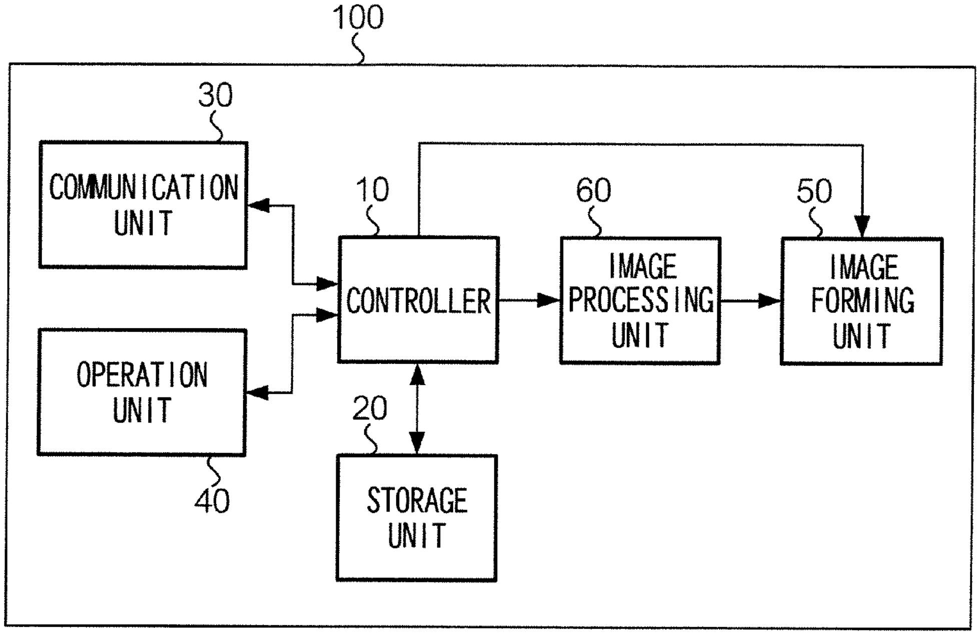
FIG. 1 shows a block diagram illustrating a general configuration of an image forming device in accordance with one embodiment of the invention.

FIG. 1 shows a block diagram illustrating a general configuration of an image forming device 100 in accordance with the present embodiment. As shown in FIG. 1, the image forming device 100 includes a controller 10, a storage unit 20, a communication unit 30, an operation unit 40, an image forming unit 50 and an image processing unit 60. The controller 10 is a control device including a CPU (Central Processing Unit), a RAM (Random Access Memory), a ROM (Read Only Memory) and so on. The controller 10 controls an element of the image forming device 100 by the CPU executing a program stored in the ROM. The storage unit 20 includes a storage device such as HDD (Hard Disk Drive). The storage unit 20 stores information (or data) used for the image formation. The communication unit 30 includes an interface device which transmits or receives data to or from an external device such as a digital still camera, a personal computer or a scanner. For example, the controller 10 obtains from the external device the image information (or data) which includes three color components, red (R), green (G), and blue (B). Hereinafter, the image information including RGB color components is referred to as "the image information in the RGB". The operation unit 40 includes an input device such as a touch panel. The operation unit 40 displays various information relating to the image formation and receives an instruction from a user. The image forming unit 50 forms on a recording medium an image in accordance with the image information input via the communication unit 30. The recording medium includes a sheet of paper made by pulp fiber (so-called plain paper), a sheet of paper coated by resin, or other medium made by a material other than the paper.

Figures 2, 6, 7:
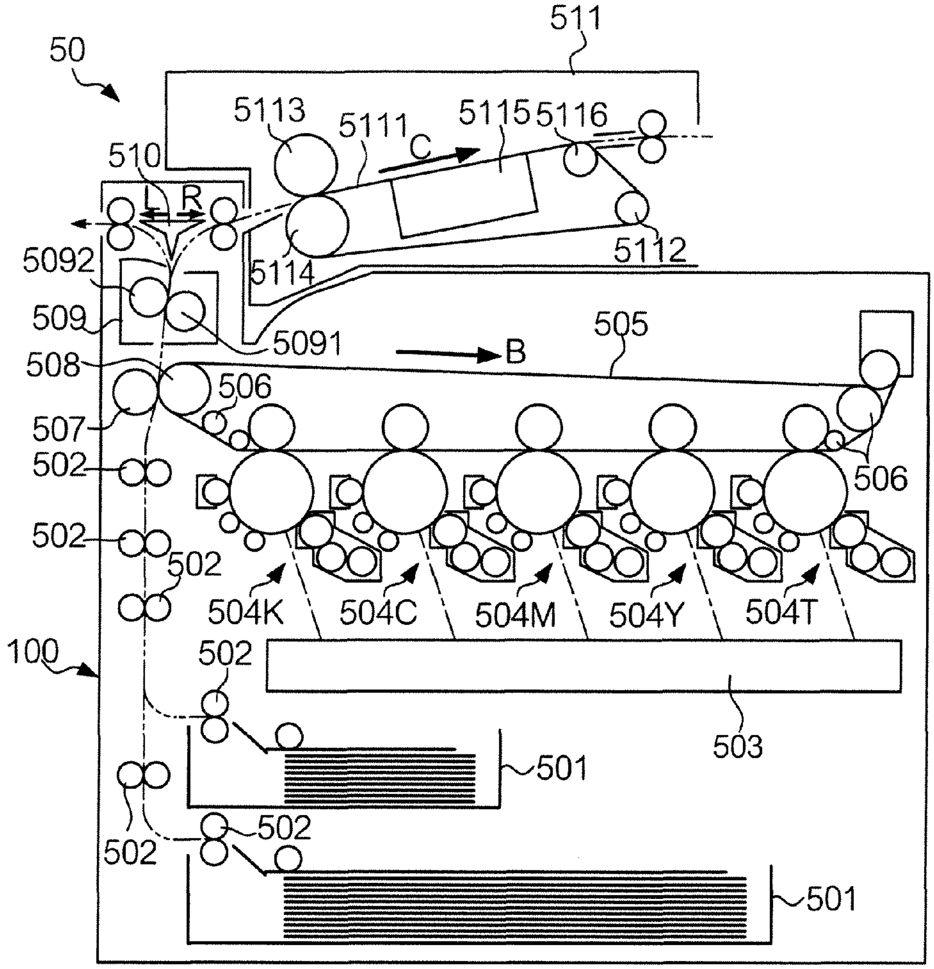
FIG. 2 shows a configuration of an image forming unit in detail.
FIG. 6 shows an experimental result.
FIG. 7 shows another experimental result.

FIG. 2 schematically shows a configuration of the image forming unit 50. As shown in FIG. 2, the image forming unit 50 includes plural paper trays 501, plural paper conveyor rollers 502, an exposure device 503, a transfer unit 504T, 504Y, 504M, 504C, 504K, an intermediate transfer belt 505, plural belt conveyor rollers 506, a secondary transfer roller 507, a backup roller 508, a primary fixing device 509, a conveyor switching mechanism 510, and a secondary fixing device 511. It is to be noted that the chain double-dashed line in FIG. 2 shows the conveyance path of a recording medium.

The paper tray 501 accommodates a recording medium having a predetermined type and size. The paper tray 501 sends out a recording medium in a timing instructed by the controller 10. The paper conveyor roller 502 conveys a recording medium to a transfer area formed by the secondary transfer roller 507 and the backup roller 508.

The exposure device 503 includes a laser light source and a polygon mirror, and irradiates a laser beam in accordance with the image information to the transfer unit 504T, 504Y, 504M, 504C, and 504K. The transfer unit 504T, 504Y, 504M, 504C, and 504K forms an image using a transparent (T) developer (or transparent toner), and color developers (or color toners) of yellow (Y), magenta (M), cyan (C), and black (K) and transfers the formed image on the intermediate belt 505, respectively. Here, the transparent toner refers to a toner which does not include a color material. The transparent toner includes, for example, polyester-resin of the low molecular weight with $SiO_2$ (the silicon dioxide) and $TiO_2$ (the titanium dioxide). The toner image developed by the transparent toner becomes transparent on a recording medium and has a glossiness similar to a metal surface. It is to be noted that the transfer unit 504Y, 504M, 504C and 504K differs in the toner to use, and their configuration are not different from each other. Therefore, when there is no need to distinguish each transfer unit, they are simply referred to as "transfer unit 504" by omitting the alphabet subscription.

Figure 3:
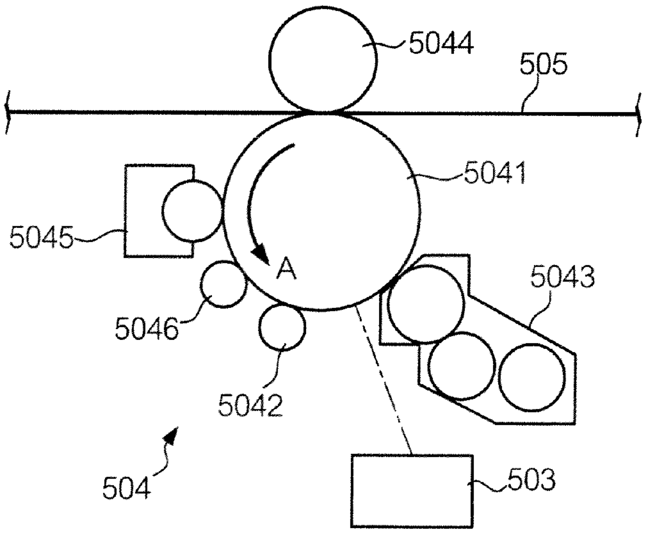
FIG. 3 shows a configuration of a transfer unit in detail.

FIG. 3 shows a configuration of the transfer unit 504 in detail. As shown in FIG. 3, the transfer unit 504 includes a photoreceptor dram 5041, a roller charging device 5042, a developer 5043, a primary transfer roller 5044, a dram cleaner

5045 and a static eliminator 5046. The photoreceptor dram 5041 is an image carrier including a charge generation layer and a charge transport layer, and is rotated to a direction of arrow A in FIG. 3 by a driving unit (not shown in the figures). The roller charging device 5042 uniformly electrifies a surface of the photoreceptor dram 5041. The charged (or electrified) surface of the photoreceptor dram is exposed by the exposure device 503 and an electrostatic latent image is formed. The developer 5043 accommodates five colors, T, Y, M, C, and K of toners. The developer 5043 makes a predetermined electric potential difference (the developing bias) from the surface of the photoreceptor dram 5041. The toner adheres to the electrostatic latent image formed on the surface of the photoreceptor dram 5041 by the electric potential difference. A toner image is formed on the surface of the photoreceptor dram 5041. The primary transfer roller 5044 makes a predetermined potential difference at a location where the intermediate transfer belt 505 faces the photoreceptor dram 5041. The toner image is transferred by the electric potential difference. The dram cleaner 5045 removes the untransferred toner which remains on the surface of the photoreceptor dram 5041 after the toner image is transferred. The static eliminator 5046 removes charges on the surface of the photoreceptor dram 5041.

Referring to FIG. 2 again, the intermediate transfer belt 505 is a belt member without the end (or an endless belt member). The belt conveyance roller 506 stretches the intermediate transfer roller 505. At least one of the belt conveyance rollers 506 has a driving unit which rotates the intermediate transfer belt 505 to a direction of the arrow B in FIG. 2. The belt conveyance roller 506 which does not have a driving unit rotates to follow the move of the intermediate transfer belt. By the intermediate transfer belt 505 rotating to a direction of the arrow B, the toner image transfer by the transfer unit 504 moves to a transfer area formed by the secondary transfer roller 507 and the backup roller 508.

The secondary transfer roller 507 and the backup roller 508 make a predetermined electric potential at a location where the intermediate transfer belt 505 faces a recording medium, and cause the toner image to be transferred on the recording medium by the electric potential difference. The primary fixing device 509 includes a heating roller 5091 and pressure roller 5092. The toner image is fixed on the recording medium by being heated and pressed by these roller.

The conveyor switching mechanism 510 has a function to change the direction of the conveyance of a recording medium. The conveyor switching mechanism 510 controls the direction of the conveyance of a recording medium as follows. If the fixing by the secondary fixing device 511 is required, the direction of the conveyance is changed to a direction of arrow R. If the fixing by the secondary fixing device 511 is not required, the direction of the conveyance is changed to a direction of arrow L.

The secondary fixing device 511 includes a fixing belt 5111, a drive roller 5112, a pressure roller 5113, a heating roller 5114, a heat sink 5115 and a strip roller 5116. The fixing belt 5111 is an endless belt member having a smooth surface. The drive roller 5112 is rotated by the driving unit (not shown in the figures) and moves the fixing belt 5111 to a direction of arrow C in the figure. The pressure roller 5113 and the fixing belt 5111 sandwich a recording medium, and the pressure roller 5113 presses the recording medium. The heating roller 5114 is a roller member including a heat source inside and applies heat to the recording medium through the fixing belt 5111. The heat sink 5115 is a cooling unit contacting the fixing belt 5111 and cools the recording medium. The strip roller 5116 stretches the fixing belt 5111. At a position of the strip roller 5116, the recording medium is stripped by its own stiffness and is ejected out of the device.

The secondary fixing device 511 heats and presses the recording medium on which the toner image is formed by the primary fixing device 509, and ejects the recording medium after cooling the recording sheet with being contacting the surface of the fixing belt 5111. As a result, the surface of the toner image formed on the surface of the recording medium is smooth as the surface of the fixing belt 5111 is copied.

Referring to FIG. 1 again, the image processing unit 60 is described. The image processing unit 60 includes an ASIC (Application Specific Integrated Circuit) and a memory to execute a predetermined image processing and generates image information having a format suitable for the image forming unit 50, on the basis of the image information in the RGB obtained through the communication unit 30. The "format suitable for the image forming unit 50" includes a group of color information showing toner images for five color components, T, Y, M, C and K. The image information obtained through the communication unit 30 includes an image area which is specified as an area representing a metallic surface. Hereinafter, this image area is referred to as a "metallic area". For example, the metallic area is an area specified by an operation of the operation unit 40 by a user when the image information in the RGB is generated at an external device. For example, the metallic area includes labeling information. Within the metallic area, the labeling information is "1" and outside the metallic area, the labeling information is "0", for example.

Figure 4:
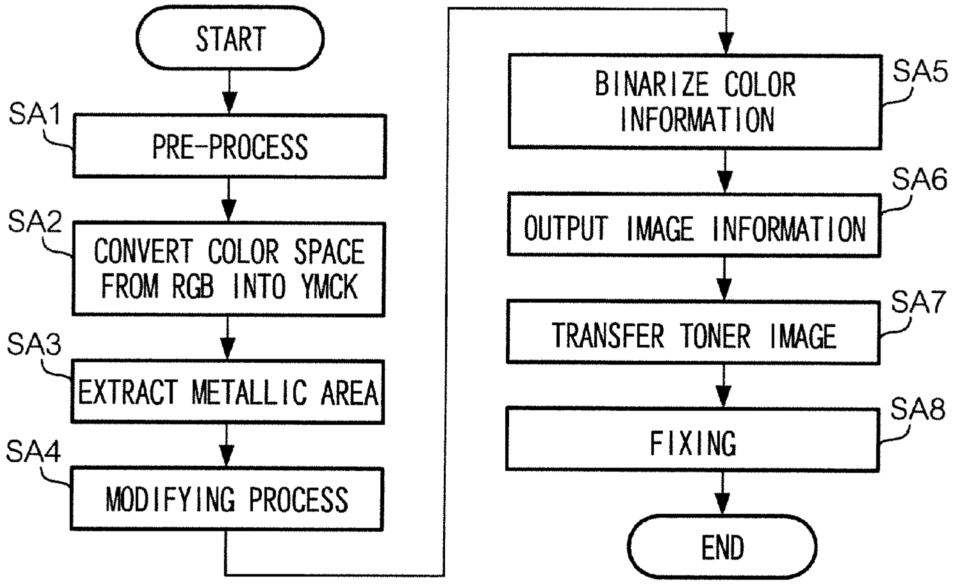
FIG. 4 shows a flowchart illustrating an operation executed by an image processing unit in accordance with a first embodiment.

FIG. 4 shows a flowchart illustrating an operation of the image processing unit 60. When the image information in the RGB obtained through the communication unit 30 is provided to the image processing unit 60, the image processing unit 60 executes (in step SA1) a predetermined pre-process if it is required. The pre-process includes, for example, a smoothing process to remove noise included in the image information, a white balance correction and shading correction.

Then, the image processing unit 60 performs (in step SA2) a color conversion process to convert the color space of the image information from the RGB color space into the YMCK color space. More specifically, the image processing unit 60 calculates color components of three colors of Y, M and C with reference to a look-up table stored in the storage unit 20 or the memory. Furthermore, the image processing unit 60 calculates the K color component with a known background removing process (for example, UCR process). According to the color conversion process, the image information in the RGB is converted into the image information including four color components of Y, M, C and K (hereinafter, referred to as "the image information in the YMCK"). Each of the color components included in the image information in the YMCK shows the grey-level value of each color toner.

The image processing unit 60 extracts (in step SA3) from the image information in the YMCK, image information corresponding to the metallic area with reference to labeling information corresponding to the metallic area included in the image information in the RGB. Next, the image processing unit 60 executes (in step SA4) the modifying process, which is a processing to randomly increase or decrease the grey-level value of each pixel by adding or subtracting a random number to or from grey-level value of Y, M, C and K for each pixel. The addition and subtraction of a random number is carried out to represent a diffused reflection by metal powder. Details of the modifying process is described later.

Figure 5A:
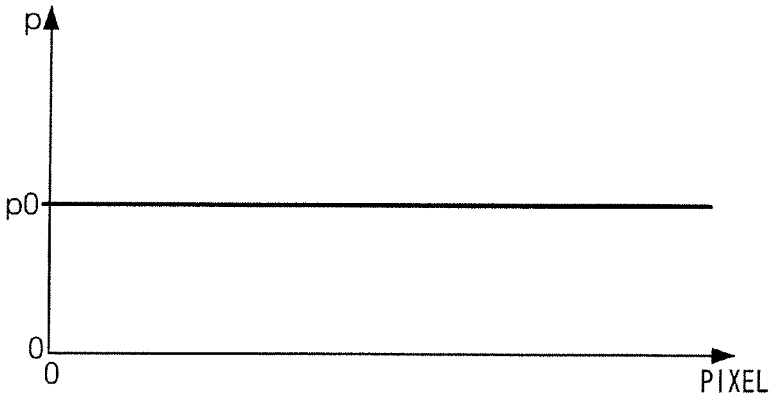
FIGS. 5A and 5B shows an example of modifying process.
Figure 5B:
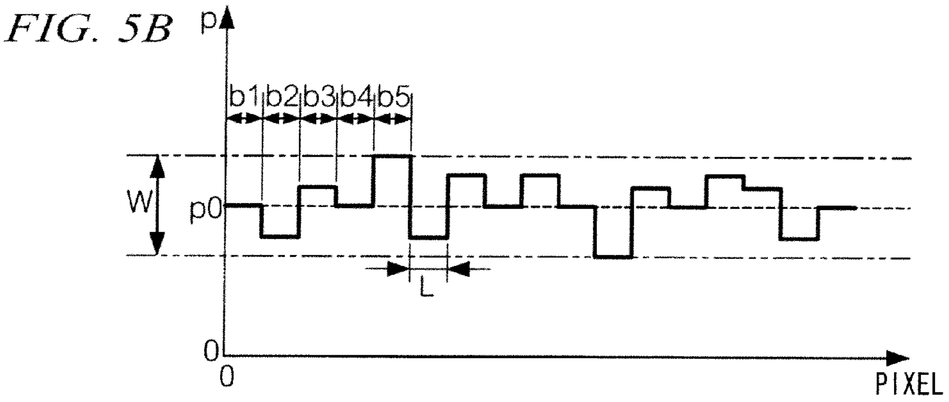

FIGS. 5A and 5B show an example of modifying process. In FIGS. 5A and 5B, the grey-level values of plural pixels included in the metallic area is shown along a fast scanning direction. The term "fast scanning direction" refers to a direction to which the exposure light by the exposure device 503 is scanned and the term "slow scan direction" refers to a direction orthogonal to the fast scan direction. In FIGS. 5A and 5B, the lateral axis shows the position of a pixel arranged in the fast scan direction and the vertical axis shows the grey-level value of each pixel. The image processing unit 60 extracts a plural successive pixels (hereinafter referred to as "pixel group") having the length L (μm: micrometers), from pixels in the metallic area shown in FIG. 5A, before the modifying process. In the present embodiment, the random number is generated by a predetermined algorithm and is allocated to each pixel group.

In the present embodiment, the length L of each pixel group is 50-80 μm (micrometers). The random number is generated within a range 5-10% of the maximum grey-level value of the pixels. For example, if the grey-level value of each pixel is expressed in 8 bits, the maximum grey-level values is "256". Therefore, the maximum value of the random number is within from 13 (≈256×5%) to 26 (≈256×10%). The image processing unit 60 sets a maximum value within a range of 13 to 26. The image processing unit 60 generates a random number within the maximum value and allocates the generated random number to each pixel group. Then, the image processing unit 60 performs the addition or the subtraction of the random number to and from the grey-level value alternately. For example, an example is given with the maximum value of "26" and that the image processing unit 60 generates random numbers as 0, 21, 16, 0, 26 . . . . In this case, the grey-level value of pixels included in an area b1, b2, b3, b4, and b5 is determined as "p0+0", "p0−21", "p0+16", "p0−0", and "p0+26" by the modifying process, respectively. The grey-level values of pixels in the metallic area are constant at p=p0 before the modifying process, After the modifying process, the grey-level value p is modified every L μm (micrometers). The width of fluctuation range W is difference between the maximum and the minimum of the grey-level value after the modifying process, in this case, W=26−(−26)=52. In other words, the width of fluctuation range W equals to 20% of the maximum grey-level value. Alternatively, in a case that the maximum value of the random number is set as 13 (equals to 5% of the maximum grey-level value), the width of fluctuation range W equals to 10% of the maximum grey-level value.

As described above, the image processing unit 60 performs the modifying process, by which a grey-level value of each color component included in the metallic area is independently modified. Here, "a grey-level value of each color component is independently modified" refers to generate different random numbers for Y, M, C and K, and modify a grey-level value of Y, M, C and K using different random numbers, respectively. The length L of the pixel group may be the same for all color components or may be different for each color component. The image processing unit performs a halftone process for each color component of T, Y, M, C and K, and binarize (in step SA5) the color information. The image processing unit 60 generates image information showing that the transparent toner is arranged at a position corresponding to the metallic area extracted in the step SA3. The image processing unit 60 outputs (in step SA6) the generated image information along with the image information binarized in the step SA5. When receiving these image information, the image forming unit 50 forms a color toner image and a transparent toner image based on the image information, and transfers (in step SA7) the color toner image and the transparent toner image on the recording medium. The transparent toner image overlaps the color toner image. The recording medium is cooled with being pressed on the surface of the fixing belt 5111 by the secondary fixing device 511 so as to fix the toner image (in step SA8), after the toner image is fixed by the primary fixing device 509 in the image forming unit 50. The recording medium on which a toner image is fixed, is output to the output tray.

By modifying the concentration (coverage ratio of a toner for a recording medium in a unit area) of the color toner in the metallic area, the diffused reflection (caused by metallic powders in the metallic image) is represented. Furthermore, by the transparent toner image overlapping the color toner image, the glossiness of the metal is represented. According to the configuration, a metallic-like image is formed on a recording medium.

1-2. Test Example

The inventors experimentally operated the image forming device to form an image in accordance with the above technology. In this experiment, Y, M, C and K toner of ApeosPort-II C7500 manufactured by Fuji Xerox Co., Ltd. was used as the color toner. The average grain diameter of the toner is approximately 7 μm (micrometers). In addition, a toner whose average grain diameter is approximately 7 μm (micrometers), was used as the transparent toner. The transparent toner was made by a resin obtained by modified toner making process for the ApeosPort-II C7500. Furthermore, ApeosPort-II C7500 was modified to install five toners, Y, M, C, K and T, and was used as the image forming device 100 shown in FIG. 2. A mirror coated platinum paper (256 $g/m^2$) manufactured by Oji Paper Co. Ltd. was used as the recording medium. A belt fixing device of a multi-function copier DocuCentre f450 manufactured by Fuji Xerox Co., Ltd was used as the secondary fixing device 511. The fixing condition of the belt fixing device was: fixing temperature 140° C. and conveyance rate of a recording medium 54 mm/s. In this experiment, a test image was used, which represents a gold with a distribution of C: 5%, M: 10%, Y: 50%, T: 100%. In the modifying process, the maximum random number is 8% of the maximum grey-level value. In other words, width of fluctuation range W is 16% (=8%+8%). For measurement of the glossiness, micro Tri-Gloss manufactured by Byk Gardner, was used. By measuring the glossiness of a test image with a measuring method defined by JIS (Japanese industrial standard) Z8741, the glossiness was approximately 80 with a light having irradiation angle of 60° (degrees).

(a) Experiment on Various Length of the Pixel Group

FIG. 6 shows a result of experiment. The upper row shows length L of a pixel group, and the lower row shows a score for each length L. The score was given by plural person with the following rule. The scores shown in FIG. 6 are averages scored by 10 test persons. The rule is as follows.

(a-1) If the test image seems to include metal powder approximately the same as a metallic image (an image formed by material including metal powder), a test person shall score 4 points for the test image.

(a-2) If the test image seems to include metal powder similarly to a metallic image to a certain degree, a test person shall score 3 points for the image.

(a-3) If the test image seems to include less metal powder similarly to a metallic image, a test person shall score 2 points for the image.

(a-4) If the test image seems not to include metal powder similarly to a metallic image, a test person shall score 1 point for the image.

The experimental result shows that the average score is greater than 2.5 points if the length L of a pixel group is within 30-120 μm (micrometers). In other words, an image seems to include metal powder similarly to a metallic image to more than a certain degree if the length L of a pixel group is within 30-120 μm (micrometers). More specifically, the experimental result shows that the average score is greater than 3.0 points if the length L of a pixel group is within 50-80 μm (micrometers). In other words, an image seems like to a metallic image if the length L of a pixel group is within 50-80 μm (micrometers).

(b) Experiment on Various Glossiness

FIG. 7 shows another result of experiment. The upper row shows glossiness of the test image with a light having irradiation angle of 60°, and the lower row shows a score for each glossiness. The score was given by plural person with the following rule. The scores shown in FIG. 7 are averages scored by 10 test persons. In this experiment, length L of a pixel group was approximately 50 μm (micrometers) and width of fluctuation range W was 16%. The rule is as follows.

(b-1) If the test image seems to have glossiness similarly to a plane metal surface, a test person shall score 4 points for the test image.

(b-2) If the test image seems to have glossiness similar to a plane metal surface to a certain degree, a test person shall score 3 points for the test image.

(b-3) If the test image seems to have less glossiness than a plane metal surface, a test person shall score 2 points for the test image.

(b-4) If the test image seems not to have glossiness similarly to a plane metal surface, a test person shall score 1 point for the test image.

The experimental result shows that if the glossiness is greater than 70, the average score is greater than 2.5 points. In other words, an image seems to have a metal-like glossiness if the glossiness is greater than 70. Thus, higher glossiness is more effective to represent metal surface in a printed image.

(c) Experiment on Various Width of Fluctuation Range

Figures 8, 9:
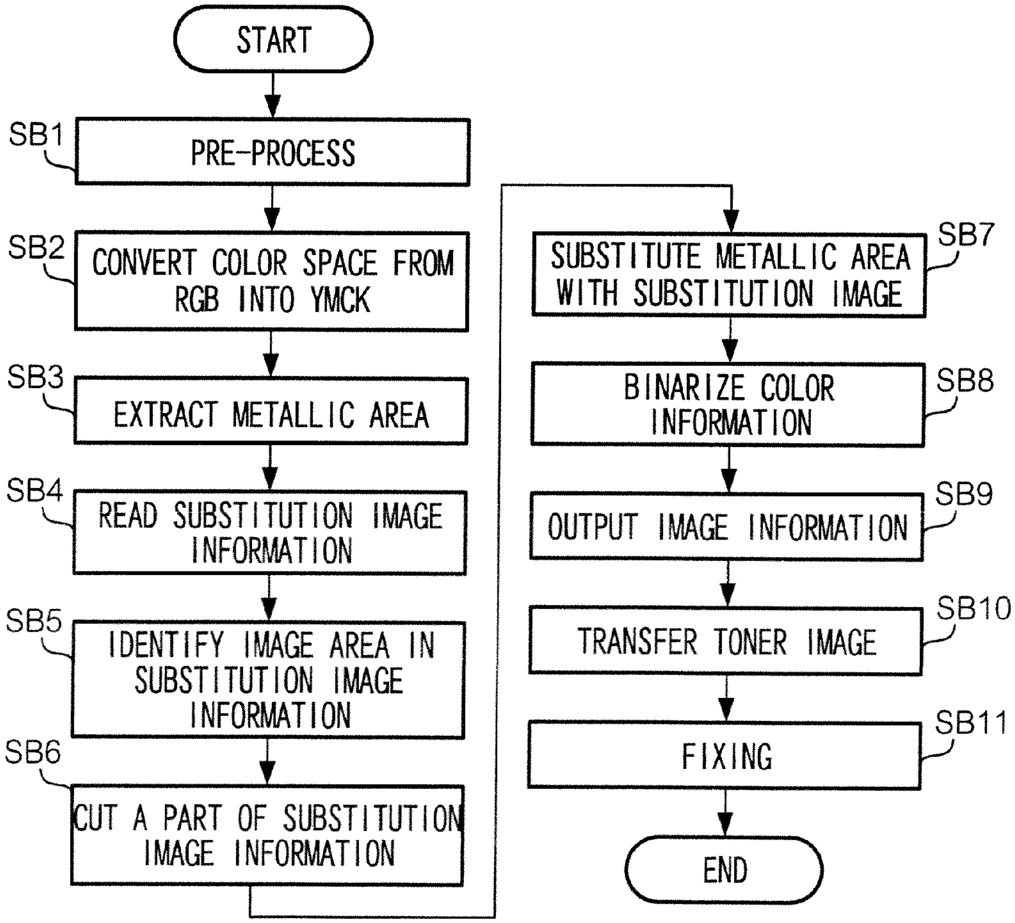
FIG. 8 shows another experimental result.
FIG. 9 shows a flowchart illustrating an operation executed by an image processing unit in accordance with a second embodiment.

FIG. 8 shows another result of experiment. The upper row shows width (or amplitude) of fluctuation range W (%) of the random number, and the lower row shows a score for each width. The score was given by plural person with the following rule. The scores shown in FIG. 8 are averages scored by 10 test persons. In this experiment, the length L of a pixel group was approximately 50 μm (micrometers) and glossiness of the test image with a light having irradiation angle of 60° was approximately 80. The rule is as follows.

(c-1) If the test image seems to have diffused reflection approximately the same as a metallic image, a test person shall score 4 points for the test image.

(c-2) If the test image seems to have diffused reflection similar to a metallic image to a certain degree, a test person shall score 3 points for the test image.

(c-3) If the test image seems to have less diffused reflection than a plane metal surface, a test person shall score 2 points for the test image.

(c-4) If the test image seems not to have diffused reflection similar to a plane metal surface, a test person shall score 1 point for the test image.

The experimental result shows that if the width W is within a range of 10-20%, the average score is greater than 2.5 points. In other words, an image seems to have a metal-like glossiness if the glossiness is greater than 70. Thus, an image has diffused reflection similar to a metallic image.

2. Second Embodiment

A second embodiment of the invention is described mainly in a point different from the first embodiment.

FIG. 9 shows a flowchart illustrating an operation executed by the image processing unit 60 of image forming device 100. The image processing unit 60 executes (in step SB1) a predetermined pre-process to the image information obtained from the controller 10. The image processing unit 60 performs (in step SB2) the color conversion process by which the color space of the image information in the RGB is converted into the YMCK color space. Next, the image processing unit 60 extracts (in step SB3) a metallic area from the image shown by the image information in the YMCK. Since the process in steps SB1-SB3 is the same as that in steps SA1-SA3, detailed description is omitted.

Next, the image processing unit 60 executes the modifying process. In the present embodiment, the image processing unit 60 executes the modifying process by replacing a metallic area with the predetermined image (hereinafter, referred to as "substitution image"). The operation is described with reference to FIG. 10

Figure 10A:
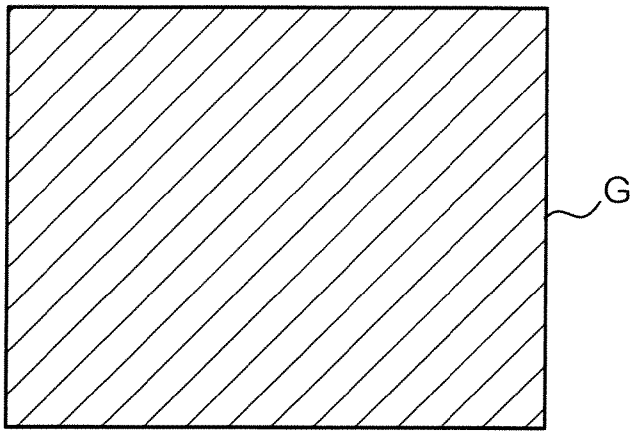
FIGS. 10A-10C shows an example of the modifying operation in the second embodiment.

First, the image processing unit 60 reads (in step SB4) from the storage unit 20 the substitution image information showing a substitution image. The substitution image may be a picture of a metal surface shot by a digital still camera. Alternatively, the substitution image may be an image generated by the image processing unit 60, by a method described in the first embodiment. For example, if the substitution image is a shot picture, the substitution image shows a surface of metal. Therefore, the grey-level value of the adjacent pixels are modifying repeatedly higher and lower as shown in FIG. 5B. The storage unit 20 stored plural substitution images, each of which corresponds to different combinations of the grey-level value of Y, M, C and K. The image processing unit 60 reads substitution image information corresponding to the grey-level value of the pixels in the metallic area. FIG. 10A shows an example of the substitution image G. The substitution image G has a rectangular shape with a size equals to a recording medium and the size of the image area is the size which is enough to form an image on a recording medium.

Figure 10B:
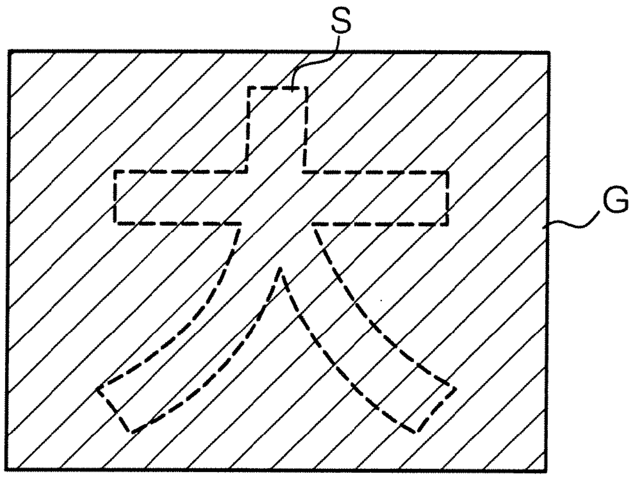

Next, the image processing unit 60 identifies (in step SB5) an image area of the substitution image information corresponding to the position of the metallic area extracted from the image information in the YMCK. FIG. 10B shows an example of the identified image area in the substitution image G. In this example, an image area S corresponding to the Japanese Kanji character " "大"" is identified.

Figure 10C:
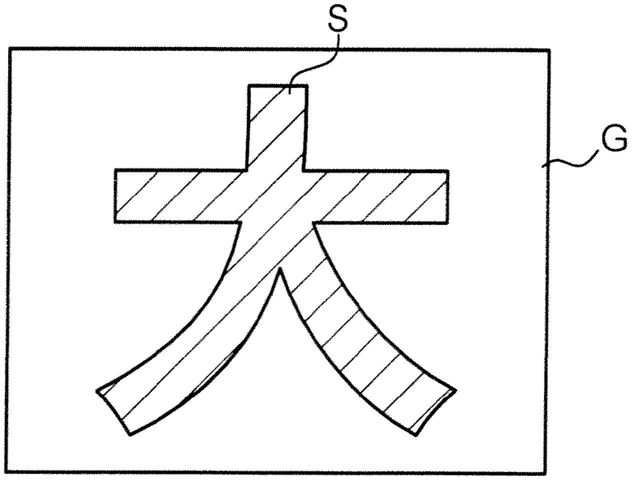

Next, the image processing unit 60 cuts (in step SB6) at least a part of image information includes in the image area S from the substitution image information as shown in FIG. 10(*c*). The image processing unit 60 substitutes (in step SB7) the metallic area with the cut image area. The process in the steps SB4-SB7 is the modifying process in accordance with the present embodiment. It is to be noted that, if more than one metallic areas are included in a single image, the image processing unit 60 executes the processing steps in SB4-SB7 for each metallic area.

After the modifying process, the image processing unit 60 performs (in step SB8) halftone process, thereby binarizing the color information. The image processing unit 60 outputs (in step SB9) image information having a format suitable for the image processing unit 50. When receiving the image information, the image forming unit 50 transfers a color toner image on a recording medium according to the image information, and further transfers (in step SB10) a transparent toner image to overlap the color toner image. Then the image forming unit 50 fixes (in step SB11) the toner image. It is to be noted that, since the process in steps SB8-SB11 are the same as those in steps SA5-SA8, detailed description for these process is omitted.

3. Further Embodiments

The above described embodiments may be modified as follows. At least two of the modifications described below may be combined.

In the above embodiment, the image processing unit 60 is included in the image forming device 100. However, the image processing unit 60 may not be included in the image forming device 100. For example, the image processing unit 60 may be an external computer device connected to the image forming device via a communication unit including a USB (Universal Serial Bus) cable or a LAN (Local Area Network). In this case, the external computer device outputs to the image forming device, the color information generated by the image processing unit 60.

In other words, each element of the image forming device 100 may be implemented as physically separated devices. Therefore, one aspect of the invention relates to an image forming system including as at least one device.

In the embodiment described above, the image processing unit 60 executes the modifying process to the image information in the YMCK, which is a suitable format for the image forming unit 50. However, the image processing unit 60 may execute the modifying process to the image information in the RGB. For example, in a case of the first embodiment, after the pre-process in step SA1, the image processing unit 60 executes the modifying process to add or subtract a random number to or from the grey-level value of each pixel included in the metallic area of the image information in the RGB (in steps SA3 and SA4). Then, the image processing unit 60 converts the image information into the image information in the YMCK, and executes process from step SA5. In a case of the second embodiment, the storage unit 20 stores substitution images including color components of R, G and B. After the pre-process in step SB1, the image processing unit 60 executes the modifying process to substitute the metallic image with the substitution image (in steps SB3-SB7). Then, the image processing unit 60 converts the image information into the image information in the YMCK, and executes a process from step SB8.

By converting a color space after the modifying process, concentration-modified image is formed similarly to the modifying process after converting the color space. Thus, either method can form an image representing metallic color. In addition, a formed image can represent metallic color as long as he image processing unit performs the modifying process for each color component regardless of color space or number of color components.

In the above described embodiment, the modifying process includes modifying the image information. Since an image representing the metallic color is formed by modifying concentration of pixels repeatedly, the metallic color may be represented as follows. The mage processing unit 60 outputs to the image forming unit 50 without performing the modifying the image information, and also outputs an instruction signal to cause the concentration in the metallic area to be modified. When forming an image, the exposure device 503 of the image forming unit 50 modulates an intensity of laser beam for an area of the transfer unit 504 corresponding to the metallic area, in response to the instruction signal. The image forming unit 50 may modulate an intensity of laser beam every 30-120 μm (micrometers). The intensity of laser beam may be modulated within a range of 10-20% of the maximum intensity. The metallic color may be represented by this configuration.

In the first embodiment, the grey-level values are constant (p=p0). The metallic color may be represented in an image having inconstant grey-level values. The image may include, for example, graded grey-level value or plural color components.

Details of the modifying process is not restricted to the first embodiment. In the first embodiment, the grey-level value p is modified every L μm (micrometers) and the amplitude is 10-20% of the maximum grey-level value. Although these conditions are preferred to represent the metallic color, the condition is not restricted to the embodiment. For example, the random number may be generated in response to a grey-level value of a pixel to be processed. Alternatively, the amplitude may be greater than 20% of the maximum grey-level value.

In the embodiment described above, the addition and the subtraction alternate one after another. In other words, a sign (+ or −) of the random number is changed one after another. However, the addition and the subtraction may not alternate one after another. For example, the addition or the subtraction may be performed for a predetermined number of successive pixel groups. Alternatively, the addition or the subtraction may be performed for a random number of successive pixel groups. Further alternatively, the random number may be generated in a range including positive number and negative number, from −26 to +26, for example. Further alternatively, the addition and the subtraction may be performed on the basis of sequence of numbers other than random number. The "modifying the grey-level value of the pixel" includes these variations.

In the second embodiment, the image area of the substitution image information is sufficiently larger than the metallic area. However, the image area of the substitution image information may be smaller than the metallic area. In this case, the image processing unit 60 juxtaposes the substitution image in the metallic area. For the boundary between the metallic area and non-metallic area, the image processing unit 60 may cut the substitution image as described in the second embodiment. In this case, the image processing unit 60 may perform a image process to blur the boundary.

The substitution image information may be image information to which the modifying process in the first embodiment has been performed. The storage unit 20 stores image information showing an image after the modifying process. For example, the image processing unit 60 performs the modifying process to an image information including four color components, Y, M, C and K. The grey-level values for each color component are constant. The image information shows a rectangular shaped image. The storage unit 20 stores the processed image as the substitution image. In this case, plural substitution images are prepared, each of which corresponds to different combination of the grey-level value of the color components. The metallic area is substituted by the substitution image as described in the second embodiment.

The direction of the modifying process is not restricted to the fast scan direction. Other direction, for example, the slow scan direction may be employed as the direction of the modifying process.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system, comprising:

an obtaining unit that obtains image information showing an image including a plurality of grey-level values of a plurality of pixels, each of the plurality of grey-level values showing a grey-level value of a pixel;

a modifying unit that modifies the grey-level values of pixels included in a metallic area within the image shown by the image information obtained by the obtaining unit, the metallic area being identified as an area representing a metallic surface;

a color image forming unit that forms on a recording medium a color image in accordance with information showing the color image including the plurality of grey-level values of the plurality of pixels modified by the modifying unit; and a transparent image forming unit that forms on the recording medium a transparent image overlapping the color image, wherein the modifying unit is configured to modify the plurality of grey-level values of the pixels by adding or subtracting a series of random numbers to or from the grey-level values, the random numbers being updated whenever the length of a row of pixels becomes 30-120 micrometers in a direction of the image shown by the image information.

2. An image forming system, comprising:

an obtaining unit that obtains image information showing an image including a plurality of grey-level values of a plurality of pixels, each of the plurality of grey-level values showing a grey-level value of a pixel;

a modifying unit that modifies the grey-level values of pixels included in a metallic area within the image shown by the image information obtained by the obtaining unit, the metallic area being identified as an area representing a metallic surface;

a storage unit that stores information showing a color image including the plurality of grey-level values of the plurality of pixels modified by the modifying unit;

a color image forming unit that forms on a recording medium a color image in accordance with the information stored in the storage unit; and a transparent image forming unit that forms on the recording medium a transparent image overlapping the color image, wherein the modifying unit is configured to modify the plurality of grey-level values of the pixels by adding or subtracting a series of random numbers to or from the grey-level values, the random numbers being updated whenever the length of a row of pixels becomes 30-120 micrometers in a direction of the image shown by the image information.

3. The image forming system according to claim 1, wherein the modifying unit is configured to modify the plurality of grey-level values of the pixels by adding or subtracting the series of random numbers to or from the grey-level values included in the image information, the random numbers being within a specified range.

4. The image forming system according to claim 3, wherein the modifying unit is configured to modify the plurality of grey-level values of the pixels by repeating alternately the addition or the subtraction.

5. The image forming system according to claim 1, wherein the modifying unit is configured to modify the plurality of grey-level values of the pixels by adding or subtracting numbers within a range of ±10- 20% of the maximum grey-level value.

6. The image forming system according to claim 1, wherein the image information includes a plurality of color components, each of which has a plurality of grey-level values, and the modifying unit is configured to modify the grey-level values for each color component.

7. The image forming system according to claim 1, wherein each of the color image forming unit and the transparent image forming unit includes: an image carrier;

an exposure unit that forms an electrostatic latent image by exposing to a light the surface of the image carrier;

a developing unit that develops the electrostatic latent image formed on the surface of the image carrier, the electrostatic latent image being developed by using a developer;

a transfer unit that transfers on the recording medium the image developed by the developing unit; and a fixing unit that fixes on the recording medium the image transferred by the transfer unit, wherein the developing unit of the color image forming unit uses a color developer and the developing unit of the transparent image forming unit uses a transparent developer.

8. The image forming system according to claim 7, wherein the fixing unit includes:

an endless belt member that transports the recording medium;

a pressure and heat applying unit that applies a pressure and a heat to the recording medium transported by the endless belt member;

a cooling unit that cools the recording medium to which the pressure and the heat are applied by the pressure and heat applying unit; and a peeling unit that peels the recording medium cooled by the cooling unit, from the endless belt member.

9. The image forming system according to claim 8, wherein the fixing unit is configured to perform fixing by which a glossiness is greater than 70, the glossiness being measured with a light irradiated at an angle of 60 degrees to the recording medium after the image is fixed on the recording medium.

10. An image forming method, comprising:

obtaining image information including a plurality of grey-level values of a plurality of pixels;

modifying the grey-level values of pixels included in a metallic area in the obtained image information, the metallic area being identified as an area representing a metallic surface, the plurality of grey-level values of the pixels is modified by adding or subtracting a series of random numbers to or from the grey-level values, the random number being updated whenever the length of a row of pixels becomes 30-120 micrometers in a direction of the image shown by the image information;

forming on a recording medium a color image in accordance with information showing the, color image including the modified grey-level value of the pixel; and forming on the recording medium a transparent image overlapping the color image.

11. The image forming system according to claim 1, wherein the plurality of pixels includes a plurality of pixel groups;

each of the plurality of pixel groups includes the same number of series of pixels, stretching in one direction;

the modifying unit is configured to modify the grey-level value by adding or subtracting the series of random numbers to or from grey-level values of the pixels in a pixel group, the random numbers being constant in a pixel group and being updated for a different pixel group.

12. The image forming system according to claim 1, wherein the image information includes a plurality of sets of grey-level values of a plurality of pixels, each set of grey-level values corresponding to a color component of the image, the random numbers being different for a different color component.

* * * * *